United States Patent
Hayashi et al.

(10) Patent No.: US 12,534,095 B2
(45) Date of Patent: Jan. 27, 2026

(54) VEHICLE CONTROL SYSTEM

(71) Applicant: TOYOTA JIDOSHA KABUSHIKI KAISHA, Toyota (JP)

(72) Inventors: Yusuke Hayashi, Atsugi (JP); Taichi Kawanai, Susono (JP); Daichi Hotta, Tokyo-to (JP); Sadayuki Abe, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 18/532,377

(22) Filed: Dec. 7, 2023

(65) Prior Publication Data

US 2024/0253650 A1 Aug. 1, 2024

(30) Foreign Application Priority Data

Feb. 1, 2023 (JP) ................. 2023-014182

(51) Int. Cl.
*B60W 50/08* (2020.01)
*B60W 30/182* (2020.01)
*B60W 60/00* (2020.01)

(52) U.S. Cl.
CPC ........ *B60W 50/087* (2013.01); *B60W 30/182* (2013.01); *B60W 50/082* (2013.01); *B60W 60/0015* (2020.02); *B60W 60/0059* (2020.02)

(58) Field of Classification Search
None
See application file for complete search history.

(56) References Cited

U.S. PATENT DOCUMENTS

| 2005/0043867 | A1  | 2/2005  | Kudo  |             |
|--------------|-----|---------|-------|-------------|
| 2020/0300204 | A1* | 9/2020  | Payne | G05D 1/021  |
| 2020/0307642 | A1  | 10/2020 | Tsuji et al. |       |
| 2020/0317218 | A1* | 10/2020 | Mao   | B60K 31/18  |
| 2020/0409360 | A1* | 12/2020 | Hwang | B60W 50/0205|

FOREIGN PATENT DOCUMENTS

| JP | 4435519 B2     | 3/2010  |
| JP | 2019-214241 A  | 12/2019 |
| JP | 2020-164075 A  | 10/2020 |

\* cited by examiner

*Primary Examiner* — Arslan Azhar
(74) *Attorney, Agent, or Firm* — Dinsmore & Shohl LLP

(57) ABSTRACT

A vehicle control system for controlling a vehicle is configured to perform automated driving by switching between a plurality of automated driving modes. The plurality of automated driving modes include: a first automated driving mode that does not require a driving operation by a human; and a second automated driving mode that requests an operation or monitoring by a human as necessary. In the first automated driving mode, the vehicle control system determines that there is human intervention when an operation state of an operating member operable by a human satisfies a first condition. In the second automated driving mode, the vehicle control system determines that there is human intervention when the operation state of the operating member satisfies a second condition. The first condition is less likely to be satisfied than the second condition.

5 Claims, 6 Drawing Sheets

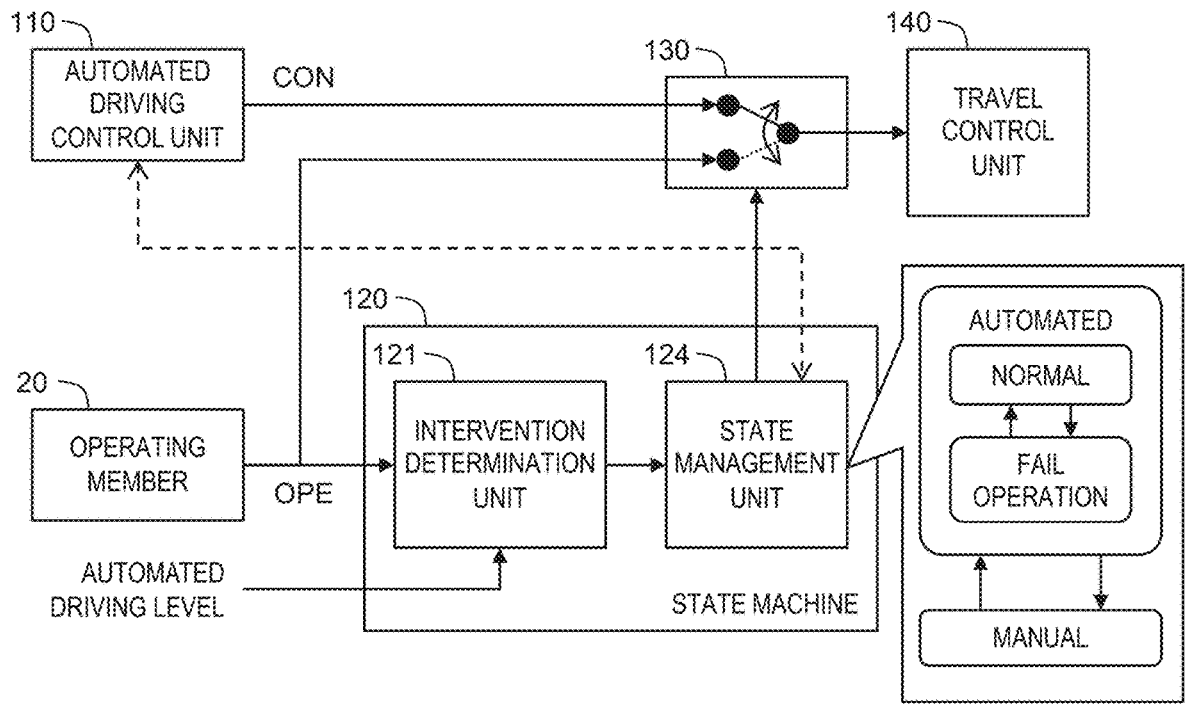

| OPERATING MEMBER | LEVEL | CONDITION FOR INTERVENTION DETERMINATION | REACTION |
|---|---|---|---|
| STEERING | LV.2 | OPERATION AMOUNT > THRESHOLD TA | MANUAL DRIVING |
| STEERING | LV.4 | OPERATION AMOUNT > THRESHOLD TB & ELAPSE OF CERTAIN TIME | FAIL OPERATION (EVACUATION) |
| BRAKE PEDAL | LV.2 | OPERATION AMOUNT > THRESHOLD TC | MANUAL DRIVING |
| BRAKE PEDAL | LV.4 | OPERATION AMOUNT > THRESHOLD TD & ELAPSE OF CERTAIN TIME | FAIL OPERATION (EMERGENCY STOP) |

FIG. 3

VEHICLE CONTROL SYSTEM

CROSS-REFERENCES TO RELATED APPLICATION

The present disclosure claims priority to Japanese Patent Application No. 2023-014182, filed on Feb. 1, 2023, the contents of which application are incorporated herein by reference in their entirety.

TECHNICAL FIELD

The present disclosure relates to a vehicle that performs automated driving by switching between a plurality of automated driving modes.

BACKGROUND ART

Patent Literature 1 discloses a vehicle travel control device having an automated driving control function. When a steering torque detected by a torque sensor exceeds a threshold value, the vehicle travel control device terminates the automated driving control.

LIST OF RELATED ART

Patent Literature 1: Japanese Patent No. 4435519

SUMMARY

A vehicle that performs automated driving by switching a plurality of automated driving modes is considered. In a certain automated driving mode, it may be desirable to easily accept human intervention. On the other hand, in another automated driving mode, it may be desirable not to easily accept human intervention, in order to suppress unintended intervention due to an erroneous operation and the like.

An object of the present disclosure is to provide a technique capable of appropriately determining intervention for each automated driving mode.

A first aspect is directed to a vehicle control system that controls a vehicle.

The vehicle control system includes one or more processors configured to perform automated driving by switching between a plurality of automated driving modes.

The plurality of automated driving modes include: a first automated driving mode that does not require a driving operation by a human; and a second automated driving mode that requests an operation or monitoring by a human as necessary.

In the first automated driving mode, the one or more processors are configured to determine that there is human intervention when an operation state of an operating member operable by a human satisfies a first condition.

In the second automated driving mode, the one or more processors are configured to determine that there is human intervention when the operation state of the operating member satisfies a second condition.

The first condition is less likely to be satisfied than the second condition.

A second aspect further includes the following feature in addition to the first aspect.

The first condition includes that an operation amount or an operation time of the operating member exceeds a first threshold value.

The second condition includes that the operation amount or the operation time of the operating member exceeds a second threshold.

The first threshold value is greater than the second threshold value.

A third aspect further includes the following feature in addition to the first aspect.

The operating member is a steering wheel, a brake pedal, or an accelerator pedal.

A fourth aspect further includes the following feature in any one of the first to third aspects.

When determining that there is the human intervention in the first automated driving mode, the one or more processors start a fail operation.

When determining that there is the human intervention in the second automated driving mode, the one or more processors terminate the automated driving.

A fifth aspect further includes the following feature in addition to the fourth aspect.

The fail operation when the operating member is a steering wheel is to evacuate the vehicle to a predetermined position.

The fail operation when the operating member is a brake pedal is to stop the vehicle.

According to the present disclosure, in the first automated driving mode that does not require a driving operation by a human, the human intervention is less likely to be accepted. Therefore, unintended intervention due to an erroneous operation of the operating member or the like is suppressed. On the other hand, in the second automated driving mode that presupposes presence of a driver or an operator, the human intervention is more likely to be accepted. This is desirable from a viewpoint of safety of the second automated driving mode.

BRIEF DESCRIPTION OF DRAWINGS

FIG. 3 is a conceptual diagram for explaining a first example of a functional configuration related to intervention determination according to an embodiment;

DETAILED DESCRIPTION

1. Overview

Figure 1:
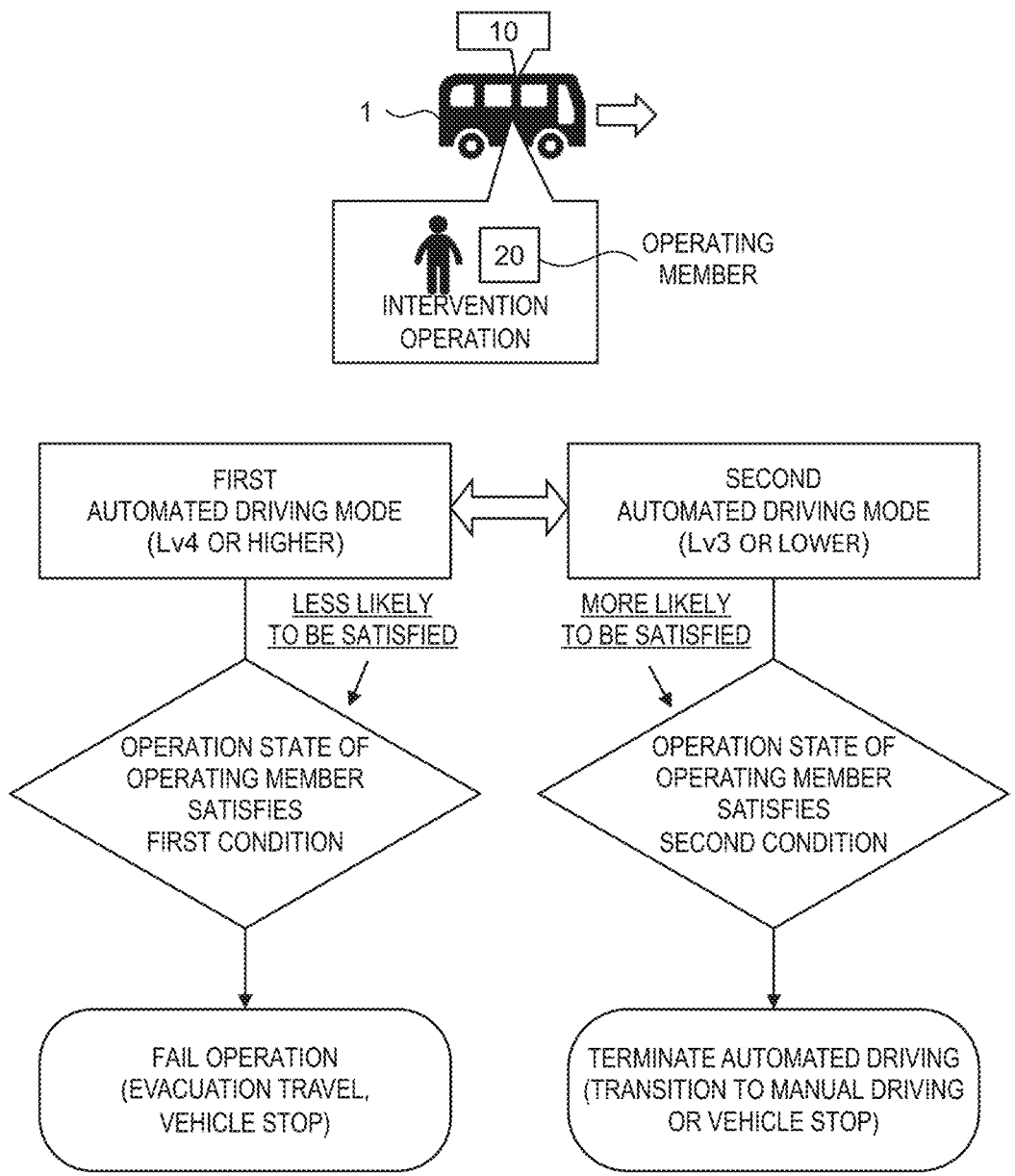
FIG. 1 is a conceptual diagram for explaining an overview of a vehicle control system according to an embodiment.

FIG. 1 is a conceptual diagram for explaining an overview of a vehicle control system 10 according to the present embodiment. The vehicle control system 10 controls a vehicle 1. Typically, the vehicle control system 10 is installed on the vehicle 1. Alternatively, at least a part of the vehicle control system 10 may be disposed in an external device to remotely control the vehicle 1.

The vehicle control system 10 controls automated driving of the vehicle 1. Here, the automated driving means automatically performing at least one of steering, acceleration, and deceleration of the vehicle 1 independently of a driver's operation. In particular, the vehicle control system 10 according to the present embodiment is configured to be able to perform automated driving by switching between a plurality of automated driving modes. The plurality of automated driving modes include at least a "first automated driving mode" and a "second automated driving mode."

The first automated driving mode does not require a driving operation by a human (a driver, an operator). In the first automated driving mode, the vehicle control system 10 executes all dynamic driving tasks. Even when it is difficult to continue the automated driving, the vehicle control system 10 performs safety control by itself without requiring human intervention. It can be said that the first automated driving mode is a mode for realizing the automated driving of so-called Level 4 or higher.

On the other hand, the second automated driving mode requests an operation by a human (a driver, an operator) as necessary. For example, when it is difficult to continue the automated driving, the vehicle control system 10 issues a transition demand to request a human to start a driving operation. The second automated driving mode may request a human to monitor the surroundings of the vehicle 1, as necessary. It can be said that the second automated driving mode is a mode for realizing the automated driving of so-called Level 3 or lower.

Moreover, the vehicle control system 10 is configured to be able to receive intervention from a human at least in the second automated driving mode. For this purpose, the vehicle control system 10 includes an operating member 20 that is operable by a human. For example, the human is an occupant (a driver, an operator) of the vehicle 1. As another example, the human may be an operator (a remote operator) who remotely operates the vehicle 1. When the human is the occupant of the vehicle 1, the operating member 20 is mounted on the vehicle 1. When the human is the remote operator, a remote operator terminal is provided with the operating member 20. Examples of the operating member 20 include a steering wheel, an accelerator pedal, a brake pedal, a joystick, a button (e.g., a deceleration button, a stop button, a start button, etc.), a switch, a lever, and the like.

When desiring to intervene in the automated driving, the human operates the operating member 20. Hereinafter, an operation of the operating member 20 performed by the human to intervene in the automated driving is referred to as an "intervention operation." For example, the intervention operation is to rotate the steering wheel. As another example, the intervention operation may be stepping on an accelerator pedal. As still another example, the intervention operation may be stepping on a brake pedal. As yet another example, the intervention operation may be pressing a button.

In a case where the intervention operation, that is, an operation state of the operating member 20 satisfies a predetermined condition, the vehicle control system 10 determines that there is human intervention. Here, it is not necessarily desirable to use the same predetermined condition for the plurality of automated driving modes. For example, in the second automated driving mode that presupposes presence of a driver or an operator, it is desirable to easily accept the human intervention in order to ensure safety. On the other hand, the first automated driving mode does not presuppose presence of a driver or an operator in principle. If a human unrelated to the vehicle operation erroneously operates the operating member 20 during the first automated driving mode, it is erroneously determined that there is the human intervention. Such an unintended intervention is not desirable from a viewpoint of continuity of the automated driving. Therefore, in the first automated driving mode, it is desirable not to easily accept the human intervention, in order to suppress such the unintended intervention due to the erroneous operation of the operating member 20 or the like.

In view of the above, the present embodiment provides a technique capable of appropriately determining intervention for each automated driving mode.

In the first automated driving mode, the vehicle control system 10 determines that there is human intervention when the operation state of the operating member 20 satisfies a "first condition." On the other hand, in the second automated driving mode, the vehicle control system 10 determines that there is human intervention when the operation state of the operating member 20 satisfies a "second condition." The first condition and the second condition are not the same but different from each others. More specifically, the first condition is set to be less likely to be satisfied than the second condition. In other words, the second condition is set to be more likely to be satisfied than the first condition.

For example, the first condition includes that an operation amount or an operation time of the operating member 20 exceeds a first threshold value. On the other hand, the second condition includes that the operation amount or the operation time of the operating member 20 exceeds a second threshold value. The first threshold value is set to be greater than the second threshold value. As a result, the first condition is less likely to be satisfied than the second condition. In other words, the second threshold value is set to be smaller than the first threshold value. As a result, the second condition is more likely to be satisfied than the first condition.

As described above, in the first automated driving mode that does not require a driving operation by a human, the human intervention is less likely to be accepted. Therefore, unintended intervention due to an erroneous operation the operating member 20 or the like is suppressed. On the other hand, in the second automated driving mode that presupposes presence of a driver or an operator, the human intervention is more likely to be accepted. This is desirable from a viewpoint of safety of the second automated driving mode.

It should be noted that in the first automated driving mode, it is not always necessary to completely exclude the human intervention. From a viewpoint of safety of the first automated driving mode, it may be desirable that there is room for the human intervention also in the first automated driving mode.

When it is determined that there is the human intervention in the first automated driving mode, the vehicle control system 10 starts a fail operation. For example, the fail operation includes evacuating the vehicle 1 to a predetermined safe position such as a road shoulder and the like. In this case, the vehicle control system 10 performs a steering operation and a deceleration operation to cause the vehicle 1 to travel to and stop at the predetermined safety position. As another example, the fail operation may include making the vehicle 1 emergency stop at the current position.

When it is determined that there is the human intervention (i.e., an override) in the second automated driving mode, the vehicle control system 10 terminates the automated driving. In this case, the driver or the operator starts manual driving and takes over driving. Alternatively, the vehicle control system 10 may stop the vehicle 1 at the current position and terminate the automated driving.

The operating member 20 may be a steering wheel, an accelerator pedal or a brake pedal. In this case, as compared with a case where the operating member 20 is a button or a switch, the human is able to more intuitively perform the intervention operation.

Hereinafter, the vehicle control system 10 according to the present embodiment will be described in more detail.

2. Configuration Example of Vehicle Control System

Figure 2:
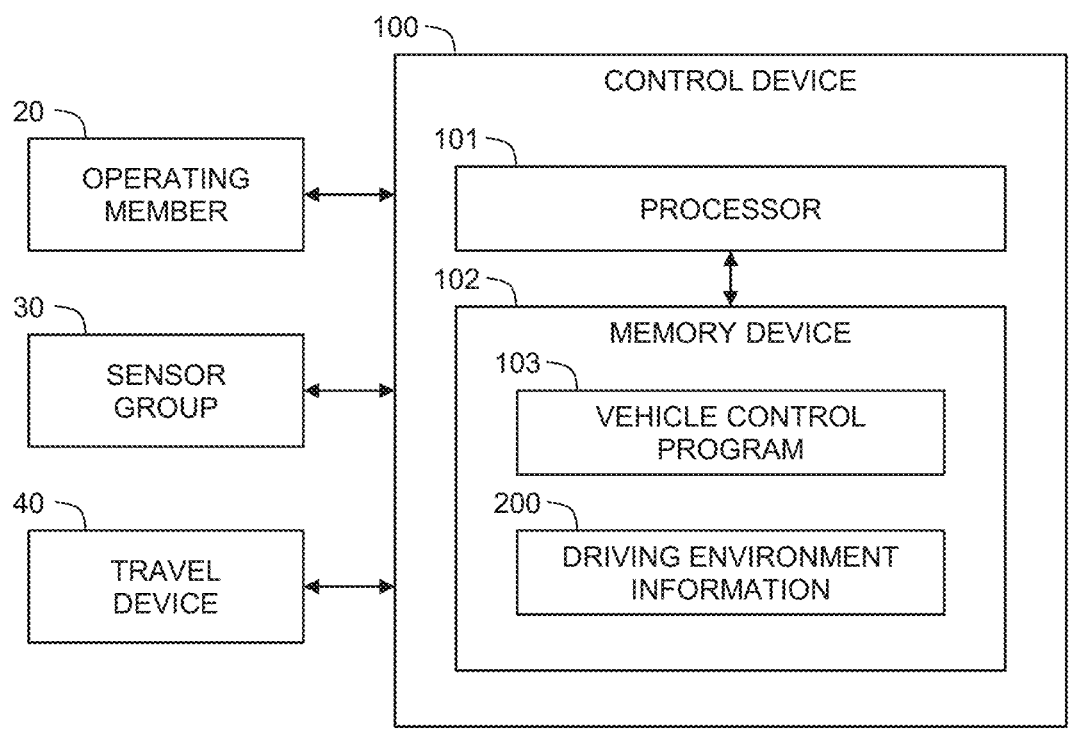
FIG. 2 is a block diagram showing a configuration example of a vehicle control system according to an embodiment.

FIG. 2 is a block diagram showing a configuration example of the vehicle control system 10 according to the present embodiment. The vehicle control system 10 includes the operating member 20, a sensor group 30, a travel device 40, and a control device 100.

As described above, the operating member 20 is a member that can be operated by a human. The operating member 20 is used for manual driving by a human. In addition, the operating member 20 is used when a human intervenes in automated driving. Examples of the operating member 20 include a steering wheel, an accelerator pedal, a brake pedal, a joystick, a button (e.g., a deceleration button, a stop button, a start button, etc.), a switch, a lever, and the like.

The sensor group 30 includes an operation sensor for detecting an operation state (an operation amount or an operation speed) of the operating member 20. The operation amount of the steering wheel is at least one of a steering angle and a steering torque, which are detected by a steering angle sensor and a steering torque sensor, respectively. The operation amount of the accelerator pedal is a stroke amount of the accelerator pedal detected by an accelerator position sensor. Alternatively, a throttle opening degree detected by a throttle position sensor may be used as the operation amount of the accelerator pedal. The operation amount of the brake pedal is a stroke amount of a brake pedal detected by a brake pedal sensor. Alternatively, a brake pressure (master cylinder pressure) detected by a brake pressure sensor may be used as the operation amount of the brake pedal. The operation speed is calculated from a temporal change in the operation amount.

The sensor group 30 further includes a recognition sensor, a vehicle state sensor, a position sensor, and the like mounted on the vehicle 1. The recognition sensor recognizes (detects) a situation around the vehicle 1. Examples of the recognition sensor include a camera, a laser imaging detection and ranging (LIDAR), a radar, and the like. The vehicle state sensor detects a state of the vehicle 1. The vehicle state sensor includes a speed sensor, an acceleration sensor, a yaw rate sensor, a steering angle sensor, and the like. The position sensor detects a position and a direction of the vehicle 1. For example, the position sensor includes a global navigation satellite system (GNSS).

The travel device 40 includes a steering device, a driving device, and a braking device. The steering device steers wheels. For example, the steering device includes an electric power steering (EPS) device. The driving device is a power source that generates a driving force. Examples of the driving device include an engine, an electric motor, and an in-wheel motor. The braking device generates a braking force.

The control device (controller) 100 is a computer that controls the vehicle 1. The control device 100 includes one or more processors 101 (hereinafter, simply referred to as processors 101) and one or more memory devices 102 (hereinafter, simply referred to as memory device 102). The processor 101 executes a variety of processing. For example, the processor 101 includes a central processing unit (CPU). The memory device 102 stores a variety of information. Examples of the memory device 102 include a volatile memory, a nonvolatile memory, a hard disk drive (HDD), a solid state drive (SSD), and the like.

A vehicle control program 103 is a computer program for controlling the vehicle 1. The functions of the control device 100 are realized by the processor 101 executing the vehicle control program 103. The vehicle control program 103 is stored in the memory device 102. Alternatively, the vehicle control program 103 may be recorded on a non-transitory computer-readable recording medium.

The control device 100 acquires driving environment information 200 indicating a driving environment for the vehicle 1. The driving environment information 200 is stored in the memory device 102. The driving environment information 200 includes map information, surrounding situation information, vehicle state information, vehicle position information, and the like.

The map information includes a general navigation map. The map information may indicate a lane configuration and a road shape.

The surrounding situation information is information acquired based on the recognition sensor and indicates a situation around the vehicle 1. For example, the surrounding situation information includes an image captured by the camera. As another example, the surrounding situation information may include point cloud information acquired by the LIDAR. The surrounding situation information may include object information related to an object around the vehicle 1. Examples of the object around the vehicle 1 include a pedestrian, another vehicle (e.g., a preceding vehicle, a parked vehicle, and the like), a white line, a traffic light, a sign, a roadside structure, and the like. The object information indicates a relative position and a relative speed of the object with respect to the vehicle 1.

The vehicle state information is information detected by the vehicle state sensor and indicates a travel state of the vehicle 1. Examples of the travel state of the vehicle 1 include a vehicle speed, a steering angle, an acceleration, a yaw rate, and the like.

The vehicle position information is information detected by the position sensor and indicates the position of the vehicle 1. Furthermore, the control device 100 may acquire highly accurate vehicle position information by a known self-position estimation process (localization) using the map information and the object information.

Further, the control device 100 executes vehicle travel control for controlling travel of the vehicle 1. The vehicle travel control includes steering control, acceleration control, and deceleration control. The control device 100 executes the vehicle travel control by controlling the travel device 40 (i.e., the steering device, the driving device, the braking device).

Furthermore, the control device 100 performs automated driving control for controlling the automated driving of the vehicle 1. For example, the control device 100 generates a travel plan of the vehicle 1 based on the driving environment information 200. Examples of the travel plan include keeping a current travel lane, making a lane change, making a right or left turn, avoiding an obstacle, and the like. Furthermore, the control device 100 generates a target trajectory necessary for the vehicle 1 to travel in accordance with the travel plan based on the driving environment information 200. The target trajectory includes a target position and a target velocity. Then, the control device 100 performs the vehicle travel control such that the vehicle 1 follows the target trajectory.

The control device 100 is able to perform the automated driving by switching between a plurality of automated driving modes. The plurality of automated driving modes include at least the first automated driving mode and the second automated driving mode. The first automated driving mode does not require a driving operation by a human. On the other hand, the second automated driving mode requests a driving operation or monitoring by a human as necessary.

There is a possibility that a human performs an intervention operation using the operating member 20 in order to intervene in the automated driving. During the automated driving control, the control device 100 determines whether or not there is human intervention. More specifically, the control device 100 acquires information on the operation state (i.e., the operation amount, the operation speed, the operation time) of the operating member 20 that is detected by the sensor group 30 (i.e., the operation sensor). When the operation state of the operating member 20 satisfies a predetermined condition, the control device 100 determines that there is the human intervention. As described above, according to the present embodiment, the predetermined condition is appropriately set for each automated driving mode.

3. Functional Configuration Example Related to Intervention Determination

3-1. First Example

FIG. 3 is a conceptual diagram for explaining a first example of a functional configuration related to the intervention determination. The control device 100 includes an automated driving control unit 110, a state machine 120, and a travel control unit 140 as functional blocks.

The automated driving control unit 110 performs the above-described automated driving control. In addition, the automated driving control unit 110 has an abnormality detection function of detecting abnormality of the automated driving control. For example, the automated driving control unit 110 detects abnormality (e.g., fixation) of data output from the sensor group 30. As another example, the automated driving control unit 110 may have a self-diagnosis function of detecting an abnormality of the automated driving control unit 110. When the abnormality of the automated driving control is detected, the automated driving control unit 110 executes a fail operation. Examples of the fail operation include evacuation travel to a predetermined safe position such as a road shoulder and the like, and stopping the vehicle 1 on the spot. Furthermore, the automated driving control unit 110 may be instructed to execute the fail operation from the state machine 120 described later. The automated driving control unit 110 generates and outputs control information CON for the automated driving control including the fail operation.

The state machine 120 includes an intervention determination unit 121 and a state management unit 124.

The intervention determination unit 121 receives manual operation information OPE indicating the operation state of the operating member 20. The intervention determination unit 121 determines whether or not the operation state of the operating member 20 satisfies a predetermined condition based on the manual operation information OPE. When the operation state of the operating member 20 satisfies the predetermined condition, the intervention determination unit 121 determines that there is human intervention. Otherwise, the intervention determination unit 121 determines that there is no human intervention.

The predetermined condition for the intervention determination is not uniform but varies depending on the automated driving level. More specifically, the predetermined condition (the first condition) in a case of a first automated driving level is less likely to be satisfied than the predetermined condition (the second condition) in a case of a second automated driving level. The intervention determination unit 121 acquires information indicating at which automated driving level the automated driving control is being performed, and sets the predetermined condition in accordance with the automated driving level.

Furthermore, the intervention determination unit 121 also determines a reaction (state transition) when determining that there is the human intervention. A content of the reaction also varies depending on the automated driving level. The content of the reaction may vary depending on a type of the operating member 20.

FIG. 3 also shows some examples of the condition for the intervention determination and the content of the reaction. Here, the first automated driving level is "Level 4," and the second automated driving level is "Level 2."

When the operating member 20 is the steering wheel, the operation is performed as follows. The predetermined condition (the second condition) in the case of Level 2 is, for example, that the operation amount of the steering wheel exceeds a threshold value TA (the second threshold value). When the second condition is satisfied, the state transition from the automated driving state to the manual driving state is determined. On the other hand, the predetermined condition (the first condition) in the case of Level 4 is, for example, that a state in which the operation amount of the steering wheel exceeds a threshold value TB (the first threshold value) continues for a certain period of time or more. The threshold value TB is greater than the threshold value TA. When the first condition is satisfied, the state transition from the normal automated driving state to the fail operation is determined. The fail operation in the case of intervention by the operation of the steering wheel is, for example, to evacuate the vehicle 1 to a predetermined safe position such as a road shoulder and the like.

When the operating member 20 is the brake pedal, the operation is performed as follows. The predetermined condition (the second condition) in the case of Level 2 is, for example, that the operation amount of the brake pedal exceeds a threshold value TC (the second threshold value). When the second condition is satisfied, the state transition from the automated driving state to the manual driving state is determined. On the other hand, the predetermined condition (the first condition) in the case of Level 4 is, for example, that a state in which the operation amount of the brake pedal exceeds a threshold value TD (the first threshold value) continues for a certain period of time or more. The threshold value TD is greater than the threshold value TC. When the first condition is satisfied, the state transition from the normal automated driving state to the fail operation is determined. The fail operation in the case of the intervention by the operation of the brake pedal is, for example, an emergency stop of the vehicle 1.

The state management unit 124 manages a state of the vehicle 1. When the automated driving function is turned ON in the manual driving state, the state transitions to the normal automated driving state. When the automated driving function is turned OFF in the automated driving state, the state transitions to the manual driving state. When an abnormality is detected by the automated driving control unit 110 in the normal automated driving state, the state transitions to the fail operation state. When the abnormality is eliminated, the state returns to the normal automated driving state. In addition, in a case where the intervention determination unit 121 determines that there is the human intervention in the normal automated driving state, the state transitions to the manual driving state or the fail operation state. As described above, whether to transition to the manual driving state or the fail operation state is determined by the intervention determination unit 121 in consideration of the automated driving level. In the case of the transition to the fail operation state, the state management unit 124 instructs the automated driving control unit 110 to start the fail operation.

A selector 130 receives the control information CON output from the automated driving control unit 110 and the manual operation information OPE indicating the operation state of the operating member 20. Furthermore, the selector 130 acquires information on the current state from the state management unit 124. When the current state is the automated driving state (including the fail operation), the selector 130 selects the control information CON and outputs the control information CON to the travel control unit 140. On the other hand, when the current state is the manual driving state, the selector 130 selects the manual operation information OPE and outputs the manual operation information OPE to the travel control unit 140.

The travel control unit 140 controls the travel device 40 in accordance with the control information CON or the manual operation information OPE selected by the selector 130 to perform the vehicle travel control.

3-2. Second Example

Figure 4:
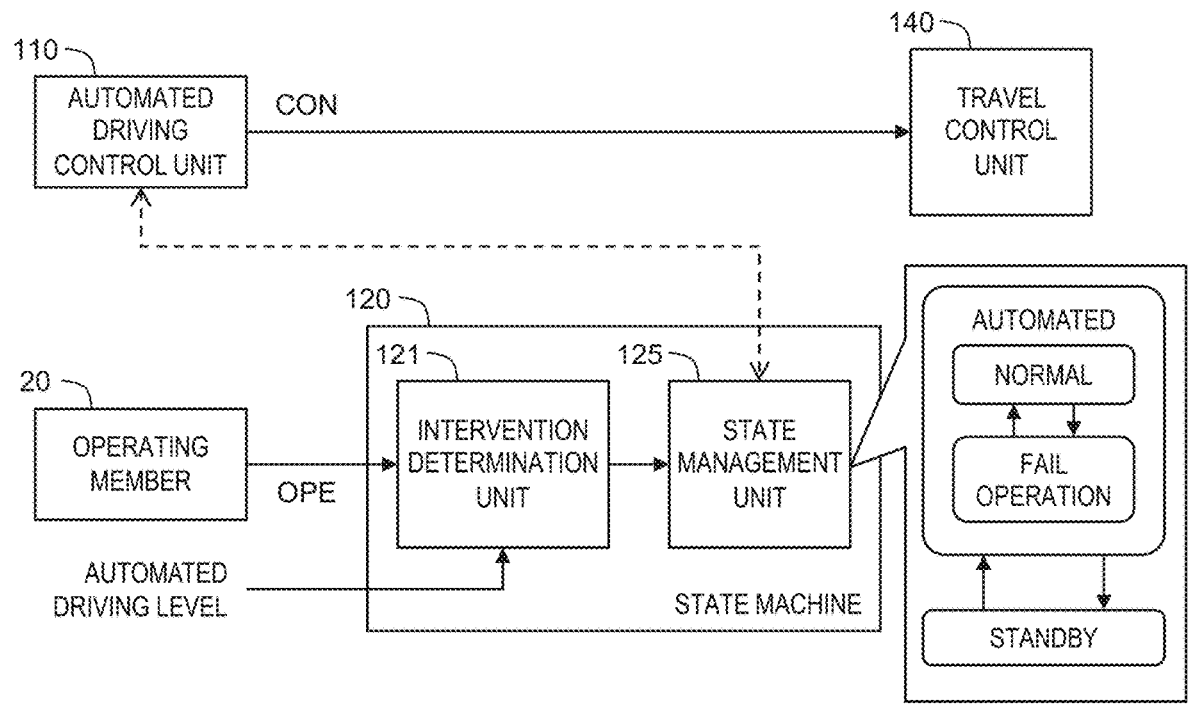
FIG. 4 is a conceptual diagram for explaining a second example of a functional configuration related to intervention determination according to an embodiment.

FIG. 4 is a conceptual diagram for explaining a second example of a functional configuration related to the intervention determination. A description overlapping with the case of the first example described above will be appropriately omitted. In the second example, the operating member 20 includes a deceleration/stop button, and a human can intervene in the automated driving by pressing the deceleration/stop button. The state machine 120 includes an intervention determination unit 121 and a state management unit 125. An example of the processing by the intervention determination unit 121 is as follows.

The predetermined condition (the second condition) in the case of Level 2 is, for example, that the deceleration/stop button is pressed. When the second condition is satisfied, the state transition from the normal automated driving state to the fail operation is determined. The fail operation is, for example, to safely decelerate and stop the vehicle 1. Thereafter, when a start button is pressed, the vehicle may return from the fail operation to the normal automated driving state.

On the other hand, the predetermined condition (the first condition) in the case of Level 4 is, for example, that a state in which the deceleration/stop button is pressed continues for a certain period of time or more. When the first condition is satisfied, the state transition from the normal automated driving state to the fail operation is determined. The fail operation is, for example, to safely decelerate and stop the vehicle 1. Thereafter, the control device 100 may request a remote center to issue a resume instruction.

The state management unit 125 manages the state of the vehicle 1. When an operation start instruction is input in a standby state, the state transitions to the normal automated driving state. The operation start instruction includes the above-described pressing of the start button and the resume instruction from the remote center. When an operation end instruction is input in the automated driving state, the state transitions to the standby state. When an abnormality is detected by the automated driving control unit 110 in the normal automated driving state, the state transitions to the fail operation state. When the abnormality is eliminated, the state returns to the normal automated driving state. In addition, when the intervention determination unit 121 determines that there is the human intervention in the normal automated driving state, the state transitions to the fail operation state. In the case of transition to the fail operation state, the state management unit 125 instructs the automated driving control unit 110 to start the fail operation.

In the second example, the selector 130 is not provided. The travel control unit 140 controls the travel device 40 in accordance with the control information CON output from the automated driving control unit 110 to perform the vehicle travel control.

3-3. Third Example

Figure 5:
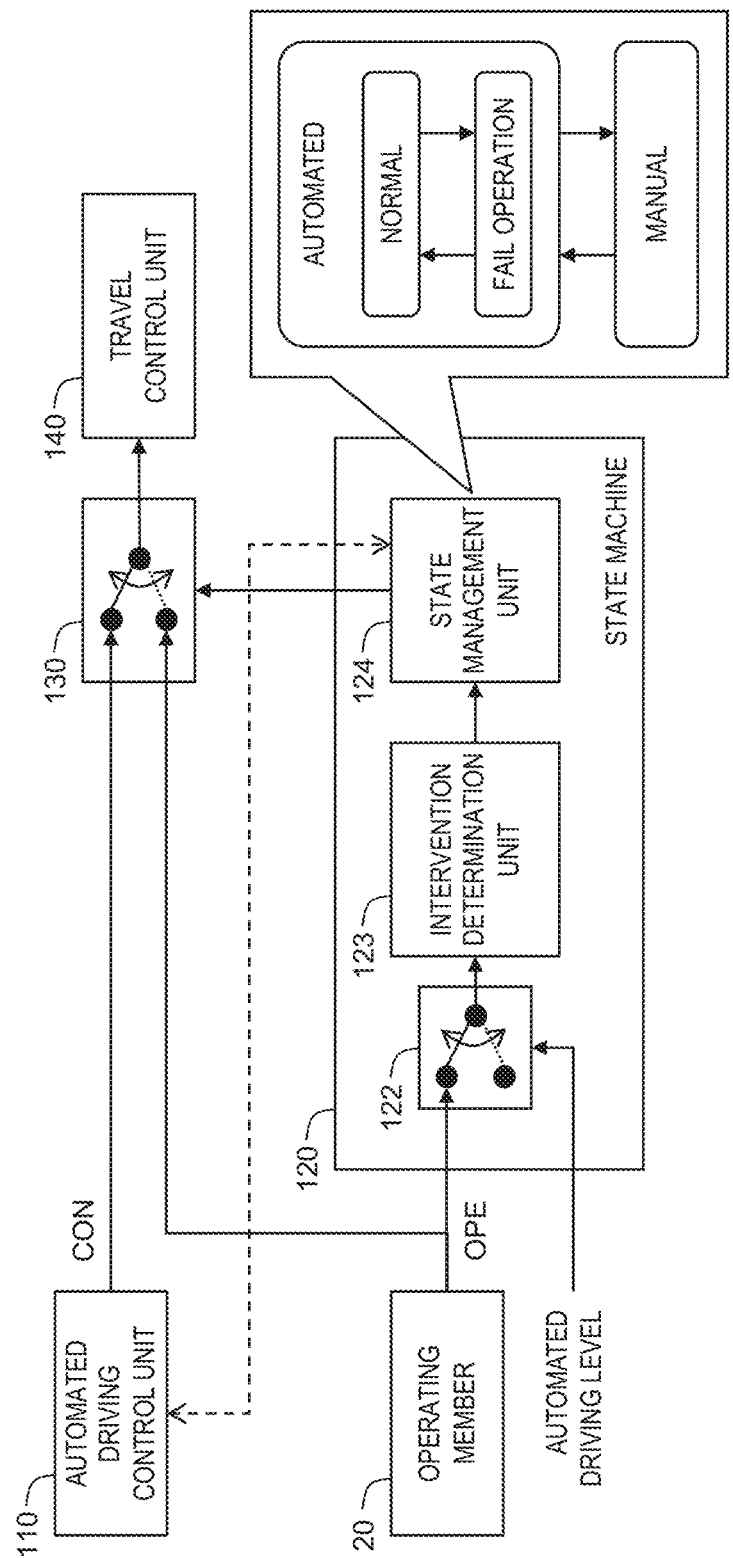
FIG. 5 is a conceptual diagram for explaining a third example of a functional configuration related to intervention determination according to an embodiment.

FIG. 5 is a conceptual diagram for explaining a third example of a functional configuration related to the intervention determination. A description overlapping with the case of the first example described above will be appropriately omitted. The state machine 120 includes a selector 122, an intervention determination unit 123, and a state management unit 124.

The selector 122 receives the manual operation information OPE indicating the operation state of the operating member 20. When the automated driving level is the second automated driving level, the selector 122 outputs the manual operation information OPE to the intervention determination unit 123 in the subsequent stage. However, when the automated driving level is the first automated driving level, the selector 122 blocks the manual operation information OPE and does not output the manual operation information OPE to the subsequent stage.

The intervention determination unit 123 determines whether or not the operation state of the operating member 20 satisfies a predetermined condition based on the manual operation information OPE. The predetermined condition is, for example, that the operation amount or the operation time of the operating member 20 exceeds a threshold value. When the operation state of the operating member 20 satisfies the predetermined condition, the intervention determination unit 123 determines that there is the human intervention. Then, the intervention determination unit 123 determines the state transition from the automated driving state (the second automated driving level) to the manual driving state.

The state management unit 124 and the selector 130 are the same as those in the first example described above.

According to the third example, in the case of the first automated driving level, the manual operation information OPE is not input to the intervention determination unit 123. That is, in the case of the first automated driving level, the presence or absence of intervention by the operation of the operating member 20 is not determined in the first place. This also suppresses unintended intervention due to an erroneous operation or the like of the operating member 20.

3-4. Fourth Example

Figure 6:
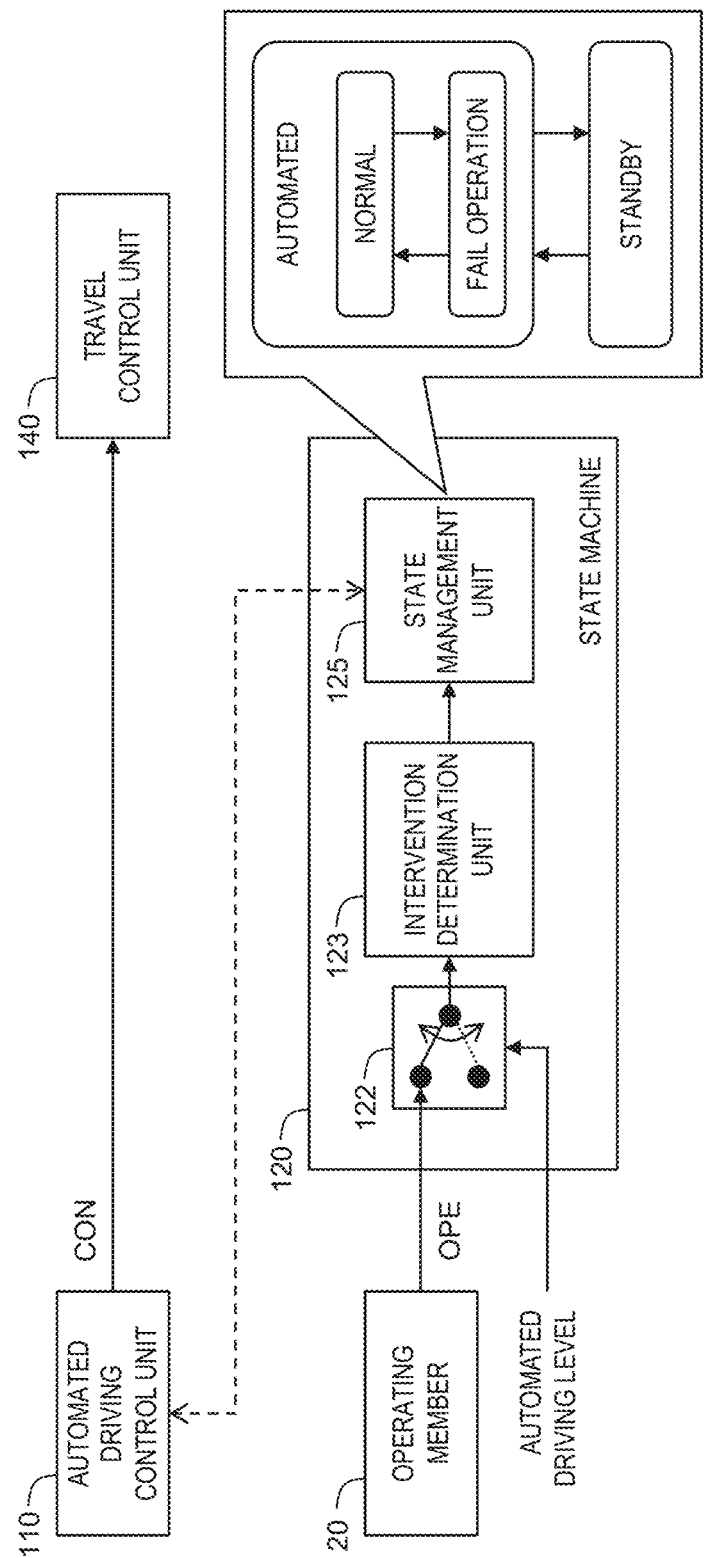
FIG. 6 is a conceptual diagram for explaining a fourth example of a functional configuration related to intervention determination according to an embodiment.

FIG. 6 is a conceptual diagram for explaining a fourth example of a functional configuration related to the intervention determination. The fourth example is a combination of the second example and the third example described above. The state machine 120 includes the selector 122, the intervention determination unit 123, and the state management unit 125. The selector 122 and the intervention determination unit 123 are the same as those in the third example described above. The state management unit 125 is the same as that in the second example described above.

What is claimed is:

1. A vehicle control system for controlling a vehicle, the vehicle control system comprising:
one or more processors configured to perform automated driving by switching between a plurality of automated driving modes, wherein the plurality of automated driving modes include:
a first automated driving mode that does not require a driving operation by a human; and
a second automated driving mode that requests an operation or monitoring by the human as necessary,
in the first automated driving mode, the one or more processors are configured to determine that there is human intervention in response to an operation state of an operating member operable by a human satisfying a first condition,
in the second automated driving mode, the one or more processors are configured to determine that there is human intervention in response to the operation state of the operating member satisfying a second condition,
the first condition is less likely to be satisfied than the second condition,
in response to determining that there is the human intervention in the first automated driving mode, the one or more processors are configured to start a fail operation as a type of the automated driving without terminating the automated driving, and
in response to determining that there is the human intervention in the second automated driving mode, the one or more processors are configured to terminate the automated driving.

2. The vehicle control system according to claim 1, wherein
the first condition includes that an operation amount or an operation time of the operating member exceeds a first threshold value,
the second condition includes that the operation amount or the operation time of the operating member exceeds a second threshold value, and
the first threshold value is greater than the second threshold value.

3. The vehicle control system according to claim 1, wherein the operating member is a steering wheel, a brake pedal, or an accelerator pedal.

4. The vehicle control system according to claim 1, wherein
the fail operation, when the operating member is a steering wheel, is to evacuate the vehicle to a predetermined position, and
the fail operation, when the operating member is a brake pedal, is to stop the vehicle.

5. A vehicle control system for controlling a vehicle,
the vehicle control system comprising one or more processors configured to perform automated driving by switching between a plurality of automated driving modes, wherein:
the plurality of automated driving modes include:
a first automated driving mode that does not require a driving operation by a human; and
a second automated driving mode that requests an operation or monitoring by a human as necessary,
in the first automated driving mode, the one or more processors are configured to determine that there is human intervention when an operation state of an operating member operable by a human satisfies a first condition,
in the second automated driving mode, the one or more processors are configured to determine that there is human intervention when the operation state of the operating member satisfies a second condition, and
the first condition is less likely to be satisfied than the second condition,
when determining that there is the human intervention in the first automated driving mode, the one or more processors start a fail operation,
when determining that there is the human intervention in the second automated driving mode, the one or more processors terminate the automated driving,
the fail operation, when the operating member is a steering wheel, is to evacuate the vehicle to a predetermined position, and
the fail operation, when the operating member is a brake pedal, is to stop the vehicle.

* * * * *